(12) United States Patent
Sheng et al.

(10) Patent No.: US 8,354,869 B1
(45) Date of Patent: Jan. 15, 2013

(54) SYSTEMS AND METHODS FOR CONTROLLING POWER SUPPLY CURRENT USING CLOCK GATING

(75) Inventors: Hongying Sheng, San Jose, CA (US); Chen Liu, Hayward, CA (US); Wei Cao, San Jose, CA (US)

(73) Assignee: Marvell International Ltd, Hamilton (BM)

( * ) Notice: Subject to any disclaimer, the term of this patent is extended or adjusted under 35 U.S.C. 154(b) by 105 days.

(21) Appl. No.: 13/090,600

(22) Filed: Apr. 20, 2011

Related U.S. Application Data

(60) Provisional application No. 61/334,487, filed on May 13, 2010.

(51) Int. Cl.
*G06F 1/04* (2006.01)

(52) U.S. Cl. .......................... 327/291; 327/298; 327/398
(58) Field of Classification Search ................... 327/291, 327/298–299, 393, 398
See application file for complete search history.

(56) References Cited

U.S. PATENT DOCUMENTS

| 8,013,654 B1 * | 9/2011 | Chen et al. ............. 327/261 |
| 8,094,476 B2 * | 1/2012 | Irby et al. ............. 365/49.17 |
| 8,174,300 B2 * | 5/2012 | Chen et al. ............. 327/261 |

* cited by examiner

*Primary Examiner* — An Luu (57) ABSTRACT

A control system includes a clock gating module and a clock comparison module. The clock gating module is configured to generate a gating signal based on an enable signal, a given period, and a base clock signal having a given frequency. The clock comparison module is configured to generate a gated clock signal based on the base clock signal and the gating signal.

20 Claims, 7 Drawing Sheets

SYSTEMS AND METHODS FOR CONTROLLING POWER SUPPLY CURRENT USING CLOCK GATING

CROSS-REFERENCE TO RELATED APPLICATIONS

This application claims the benefit of U.S. Provisional Application No. 61/334,487, filed on May 13, 2010. The disclosure of the above application is incorporated herein by reference in its entirety.

FIELD

The present disclosure relates to power supplies and more particularly to systems and methods for controlling power supply current using clock gating.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A power supply outputs a voltage that may be used to power one or more components. For example, the voltage may power one or more components of an integrated circuit (IC). Specifically, the IC may draw current from the power supply when the IC is on. For example, the IC may include a switch that selectively connects the power supply to the IC. A magnitude of the current draw is related to the overall capacitance of the IC. A large IC, therefore, may draw a large amount of current from the power supply. The power supply, however, may not be able to supply the requested current. The excessive current request may decrease performance of the IC due to current lag and/or may damage the power supply.

SUMMARY

A control system includes a clock gating module and a clock comparison module. The clock gating module is configured to generate a gating signal based on an enable signal, a given period, and a base clock signal having a given frequency. The clock comparison module is configured to generate a gated clock signal based on the base clock signal and the gating signal.

In other features, the clock gating module is configured to generate the gating signal to increase a frequency of the gated clock signal from zero to the given frequency during the given period. In other features, the frequency of the gated clock signal increases linearly or exponentially during the given period.

In other features, the clock gating module is configured to generate the gating signal to decrease the frequency of the gated clock signal from the given frequency to zero during the given period. In other features, the frequency of the gated clock signal decreases linearly or exponentially during the given period.

In other features, the clock comparison module is configured to generate the gated clock signal based on a comparison of the base clock signal and the gating signal. In other features, the comparison includes performing a logical AND operation of the base clock signal and the gating signal.

In other features, the gating module is configured to generate the gating signal based on the given period and the given frequency when the enable signal is in a first state. In other features, the gating module is configured to generate a gating signal having a constant first state when the enable signal is in a second state.

In other features, the clock comparison module is configured to generate the gated clock signal based on the base clock signal and the gating signal when the enable signal is in a first state, and is configured to generate the gated clock signal based on the base clock signal when the enable signal is in a second state.

A method includes generating a gating signal based on an enable signal, a given period, and a base clock signal having a given frequency, and generating a gated clock signal based on the base clock signal and the gating signal.

In other features, the method includes generating the gating signal to increase a frequency of the gated clock signal from zero to the given frequency during the given period. In other features, the frequency of the gated clock signal increases linearly or exponentially during the given period.

In other features, the method includes generating the gating signal to decrease the frequency of the gated clock signal from the given frequency to zero during the given period. In other features, the frequency of the gated clock signal decreases linearly or exponentially during the given period.

In other features, the method includes generating the gated clock signal based on a comparison of the base clock signal and the gating signal. In other features, the comparison includes performing a logical AND operation of the base clock signal and the gating signal.

In other features, the method includes generating the gating signal based on the given period and the given frequency when the enable signal is in a first state. In other features, the method includes generating a gating signal having a constant first state when the enable signal is in a second state.

In other features, the method includes generating the gated clock signal based on the base clock signal and the gating signal when the enable signal is in a first state, and generating the gated clock signal based on the base clock signal when the enable signal is in a second state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Connections between an integrated circuit (IC) and a power supply may have a built-in inductance. For example, leads on a printed circuit board (PCB) have a built-in inductance. The inductance may decrease a rate of change of current flowing from the power supply to the IC. Specifically, the IC may draw a large amount of current when switched on, but the rapid change in current may be slowed by the inductance. Therefore, a voltage at the IC may decrease for a period before reaching steady-state. The power supply may be modified to generate more current. However, producing application-dependent power supplies may be costly.

The magnitude of the current drawn by the IC is a function of the overall capacitance of the IC, the overall inductance of the IC, and a frequency of a clock that controls switching within the IC. The current request, therefore, may be controlled by adjusting the clock frequency. After switching the IC on, the clock frequency may be increased from zero to a desired clock frequency during a desired period. Clock gating is one technique used to save power in an IC. Clock gating includes circuits that enable or disable the clock. For example, the clock may be enabled when the IC is on and may be disabled when the IC is off. Clock gating, therefore, may also be used to control the clock frequency.

Accordingly, systems and methods are presented for controlling current output by a power supply using clock gating. The systems and methods may generate a gating signal when enabled based on a desired period and a base clock signal having a desired frequency. The desired period may be input by a user. The desired frequency may be input by a user or may be predetermined and stored in memory. The systems and methods may then generate a gated clock signal based on the desired period and the desired frequency. For example, the systems or methods may be implemented in a clocking circuit that resides on a PCB, the PCB further including a power supply and a clocked circuit. Specifically, for example only, the systems or methods may be implemented in soft output Viterbi algorithm (SOVA) decoder systems.

When the IC is turned on, the systems and methods may generate the gating signal to increase the frequency of the gated clock signal from zero to the desired frequency during the desired period. Additionally or alternatively, when the IC is to be turned off, the systems and methods may generate the gating signal to decrease the frequency of the gated clock signal from the desired frequency to zero during the desired period, and then the IC may be turned off. For example, the systems and methods may generate the gated clock signal using a logical AND of the base clock signal and the gating signal. In some implementations, the change in the frequency of the gated clock signal may be linear. In other implementations, the change in the frequency of the gated clock signal may be non-linear. For example, the non-linear change in the gated clock frequency may be exponential.

Figure 1:
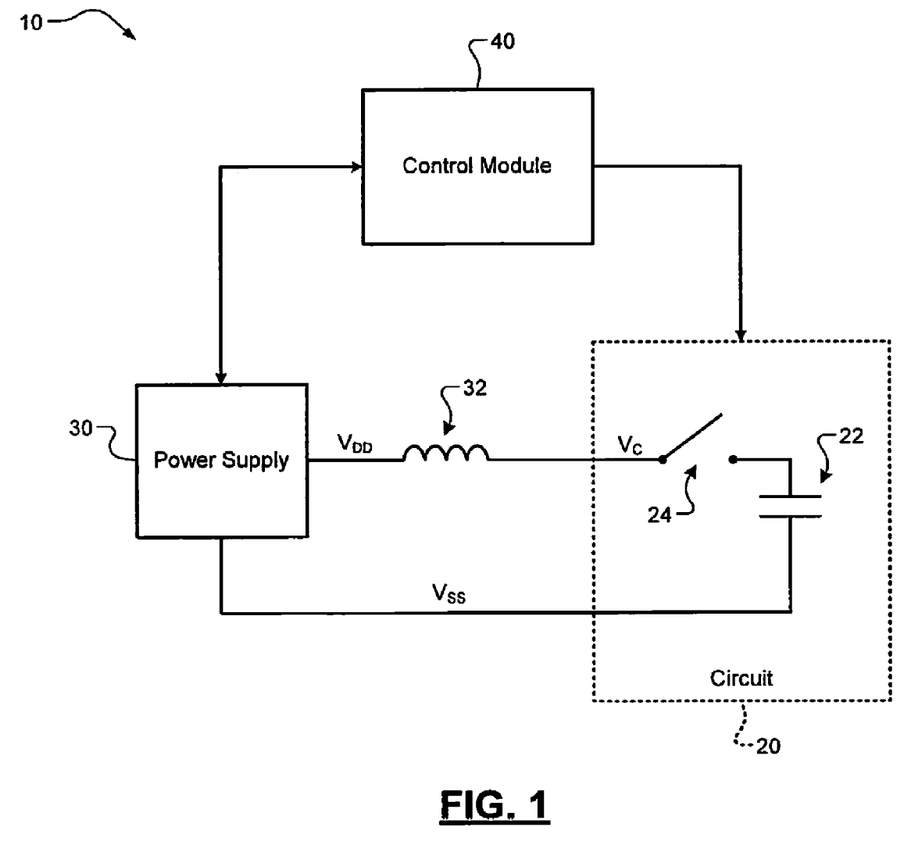
FIG. 1 is a functional block diagram of an example of a system according to one implementation of the present disclosure.

Referring now to FIG. 1, an example of a system 10 is shown. The system 10 includes a circuit 20 powered by a power supply 30. For example, the circuit 20 may be an IC and hereinafter may be referred to as the IC 20. The IC 20 may be represented as a capacitor 22 connected in series with a switch 24. The capacitor 22 has a capacitance ($C_{IC}$) representing a total capacitance of the IC 20. The total capacitance $C_{IC}$ increases as a size of the IC 20 increases. Actuating the switch 24 turns the IC 20 on or off. Specifically, the switch 24 controls a connection between the power supply 30 and the IC 20. For example, the switch 24 may include one or more transistors.

The power supply 30 supplies current to the IC 20 based on a current request by the IC 20. The connection between the power supply 30 and the IC 20 has a built-in inductance ($I_{BI}$) represented by an inductor 32. The built-in inductance $I_{BI}$ may decrease the rate of change in current supplied by the power supply 30 to the IC 20. For example, a rapid change in current requested by the IC 20 may cause a voltage ($V_c$) at the IC 20 to drop from a voltage ($V_{DD}$) output by the power supply 30. The power supply 30 may also supply a steady-state voltage ($V_{SS}$) to the IC 20. For example, the steady-state voltage $V_{SS}$ may be zero volts (V).

A control module 40 controls the IC 20 and/or the power supply 30. Specifically, the control module 40 may control the switch 24 to turn the IC 20 on. The control module 40 may also enable/disable the power supply 30. In addition, the control module 40 controls switching in the IC 20. The control module 40 may generate a clock signal and may also perform clock gating. Specifically, the control module 40 may generate a gated clock signal that controls switching in the IC 20. Therefore, the control module 40 may also implement the system or method of the present disclosure.

Figure 2A:
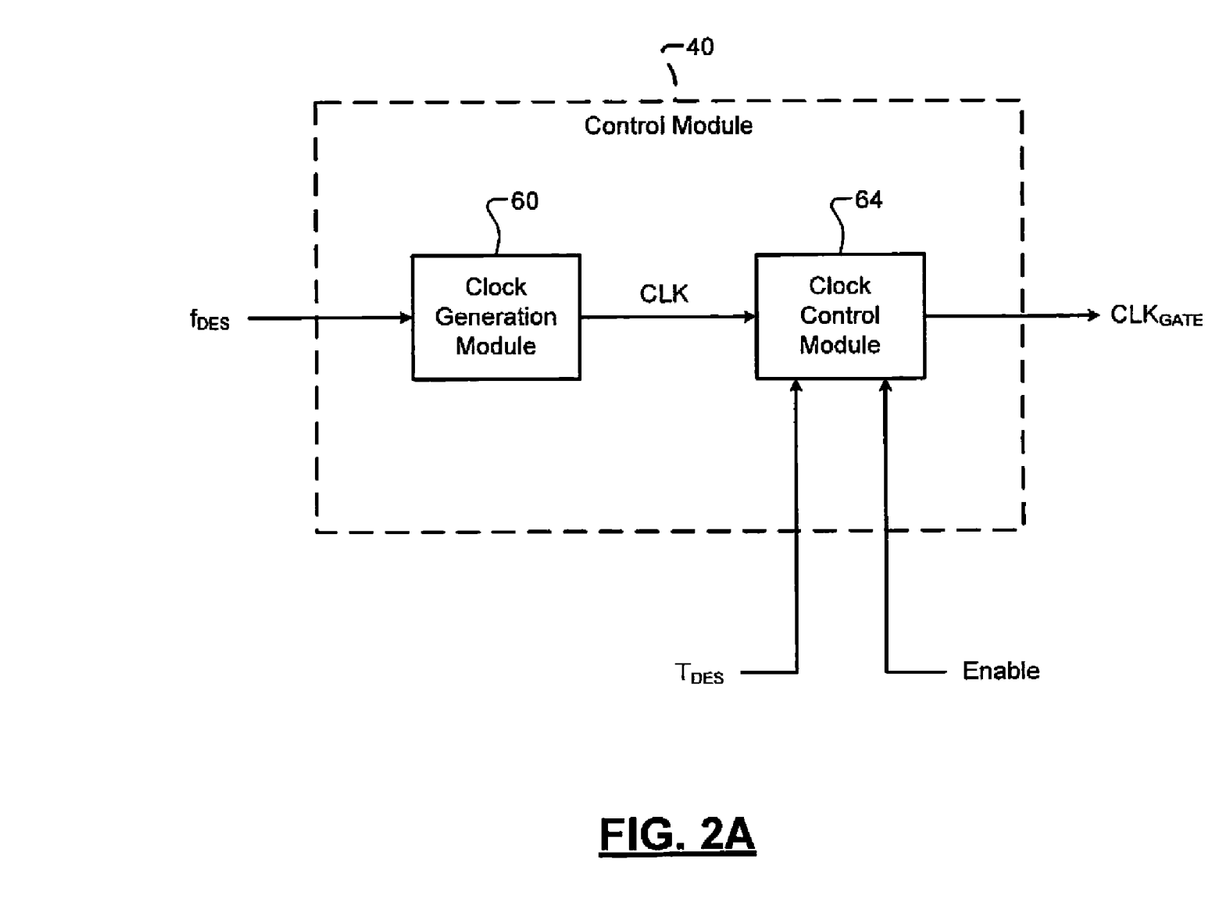
FIG. 2A is a functional block diagram of an example of a control module according to one implementation of the present disclosure.

Referring now to FIG. 2A, a first example of the control module 40 is shown. The control module includes a clock generation module 60 and a clock control module 64. The clock generation module 60 receives a desired frequency ($f_{DES}$) for the clock signal (CLK). For example, the clock generation module 60 may include a pulse width modulator (PWM) that generates a base clock signal having the desired frequency $f_{DES}$. A value of the desired frequency $f_{DES}$ may be input by a user. The value of the desired frequency $f_{DES}$, however, may also be predetermined and stored in memory. For example only, the value of the desired frequency may be 2 gigahertz (GHz).

The clock control module 64 receives the clock signal CLK. The clock control module 64 may also receive the desired frequency $f_{DES}$ or alternatively may determine the desired frequency $f_{DES}$ from the clock signal CLK. The clock control module 64 also receives a desired period $T_{DES}$ and an enable signal. The desired period $T_{DES}$ represents a period during which the clock signal is gate-controlled. For example, a value of the desired period $T_{DES}$ may be input by the user. In some implementations, the value of the desired period $T_{DES}$ may also be predetermined and stored in memory.

The clock control module 64 generates a gated clock signal ($CLK_{GATE}$) based on the clock signal CLK (i.e., the desired frequency $f_{DES}$), the desired period $T_{DES}$, and the enable signal. Specifically, a frequency ($f_{CLK}$) of the gated clock signal $CLK_{GATE}$ may be less than or equal to the desired frequency $f_{DES}$. The enable signal enables or disables the power supply current control feature of the present disclosure. The enable signal may be input by the user. In other words, when disabled the clock control module 64 may not control the power supply current (i.e., $CLK_{GATE}=CLK$). Rather, when disabled the power supply 30 may output a fixed current based on the clock CLK.

Specifically, the frequency $f_{CLK}$ of the gated clock signal $CLK_{GATE}$ generated by the clock control module 64 may either (i) increase from zero to the desired frequency $f_{DES}$ during the desired period $T_{DES}$ or (ii) decrease from the desired frequency $f_{DES}$ to zero during the desired period $T_{DES}$. The change in the frequency $f_{CLK}$ may be either linear or non-linear. For example, non-linear change of the frequency $f_{CLK}$ may be exponential.

For example only, the frequency $f_{CLK}$ may be based on a quotient where the desired frequency $f_{DES}$ is periodically divided by a decreasing factor throughout the desired period. This periodic division by a decreasing factor may also be referred to as an exponential increase. For example, the decreasing factors may be $2^8, 2^7, 2^6, \ldots, 2^1$, and $2^0$. Therefore, for example only, for a desired frequency $f_{DES}$ of 2 GHz, the frequency $f_{CLK}$ of the gated clock signal $CLK_{GATE}$ may be as follows during the desired period $T_{DES}$:

$$0, 7.8125, 15.625, 31.25, 62.5, 125, 250, 500, 1000, 2000 \quad (1),$$

where each number in the sequence is in megahertz (MHz).

Figure 2B:
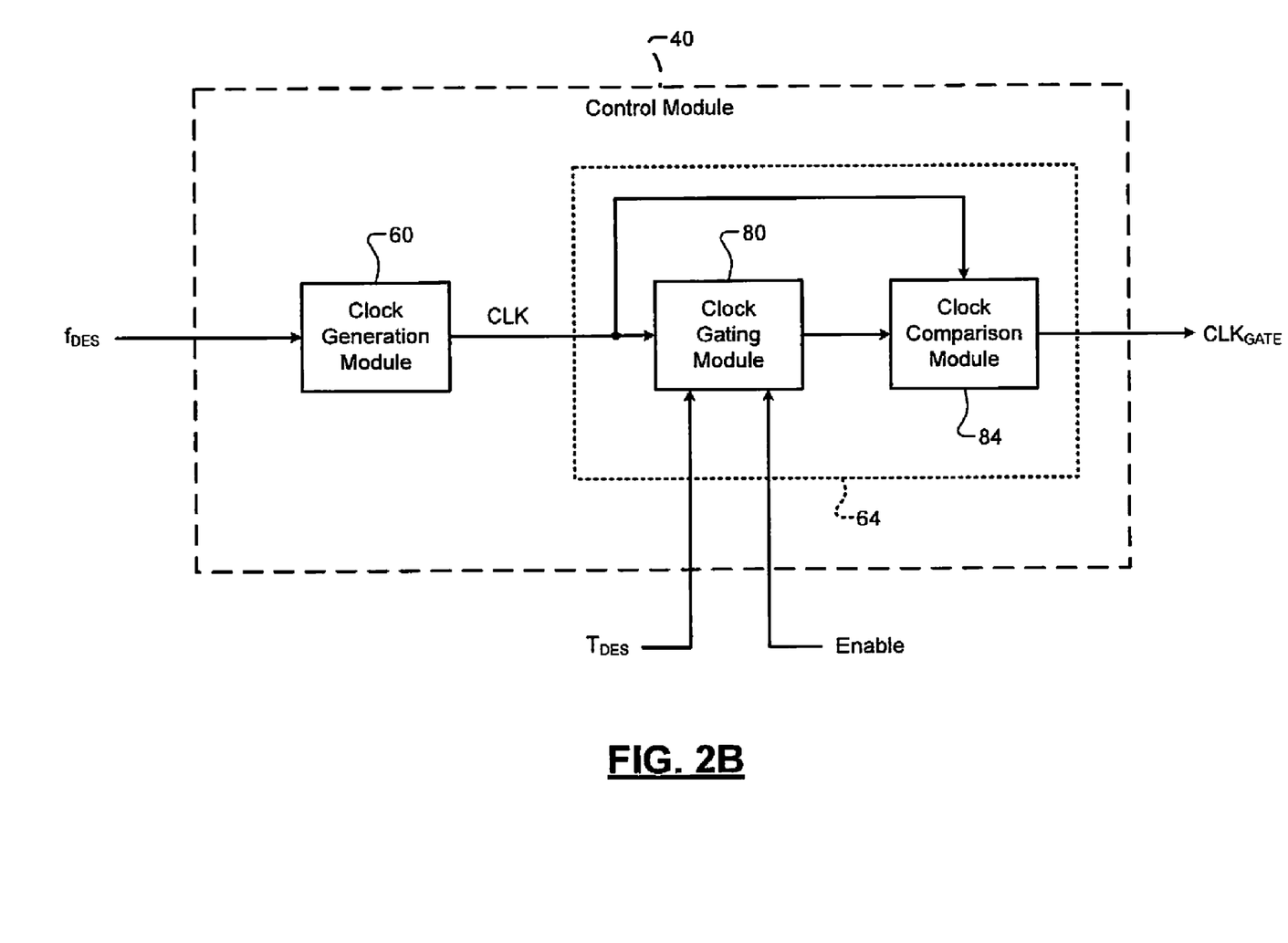
FIG. 2B is a functional block diagram of an example of a control module according to another implementation of the present disclosure.

Referring now to FIG. 2B, a second example of the control module 40 is shown. The control module 40 includes the clock generation module 60, a clock gating module 80, and a clock comparison module 84. The clock gating module 80 and the clock comparison module 84 may represent sub-modules of the clock control module 64 (see above and FIG. 2A).

The clock gating module 80 receives the base clock signal CLK having the desired frequency $f_{DES}$ from the clock generation module 60. The clock gating module 80 may also receive the desired frequency $f_{DES}$ or determine the desired frequency $f_{DES}$ from the base clock signal CLK. The clock gating module 80 also receives the desired period $T_{DES}$ and the enable signal. As previously described, for example, the desired period $T_{DES}$ and the enable signal may be input by the user.

The clock gating module 80 generates a gating signal based on the enable signal, the desired period $T_{DES}$, and the base clock signal CLK having the desired frequency $f_{DES}$. Specifically, when the enable signal is a first state (i.e., enabled) the clock gating module 80 may generate the gating signal to increase the frequency $f_{CLK}$ of the gated clock signal $CLK_{GATE}$ from zero to the desired frequency $f_{CLK}$ during the desired period $T_{DES}$. Alternatively, when the enable signal is the first state, the clock gating module may generate the gating signal to decrease the frequency $f_{CLK}$ of the gated clock signal $CLK_{GATE}$ from the desired frequency $f_{DES}$ to zero during the desired period. When the enable signal is a second state (i.e., disabled), the clock gating module 80 may generate the gating signal having a constant first state. Rather, the gating signal having a constant first state may not adjust the frequency $f_{CLK}$ of the gated clock signal $CLK_{GATE}$.

The clock comparison module 84 receives the gating signal and the base clock signal CLK. The clock comparison module 84 generates the gated clock signal $CLK_{GATE}$ based on the gating signal and the base clock signal CLK. For example, the clock comparison module 84 may perform a logical AND of the gating signal and the base clock signal CLK. Therefore, for example only, when the enable signal is the second state (i.e., disabled) the clock comparison module 84 may generate a gated clock signal $CLK_{GATE}$ equal to the base clock signal CLK. In other words, when disabled the frequency $f_{CLK}$ of the gated clock signal $CLK_{GATE}$ may be set to the desired frequency $f_{DES}$ when the IC 20 is turned on or may be set to zero when the IC 20 is turned off.

Figure 3A:
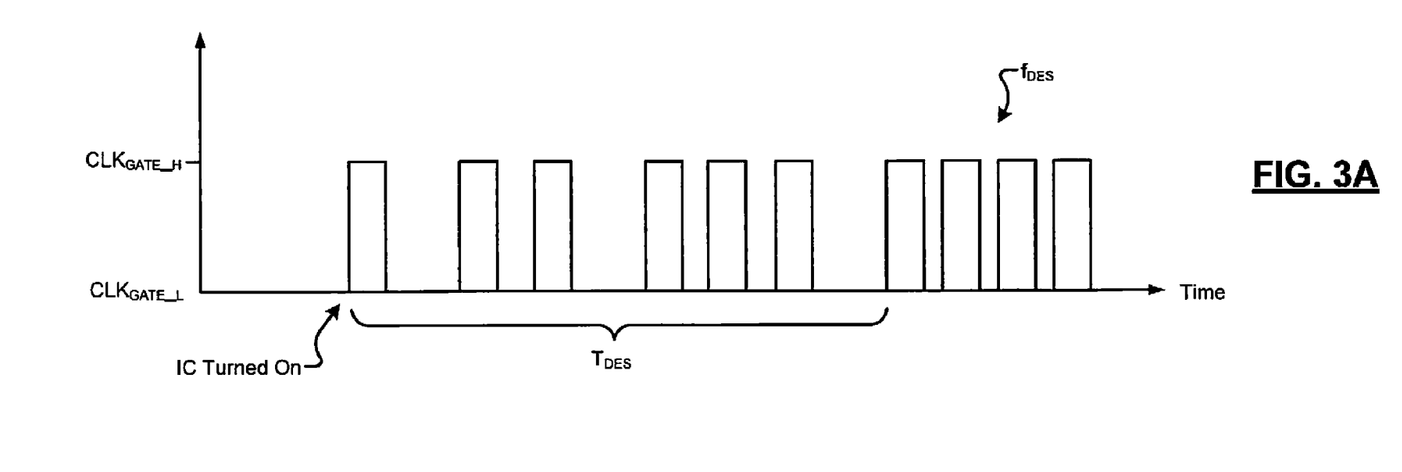
FIGS. 3A-3B are examples of timing diagrams illustrating power supply current control using clock gating according to one implementation of the present disclosure.
Figure 3B:
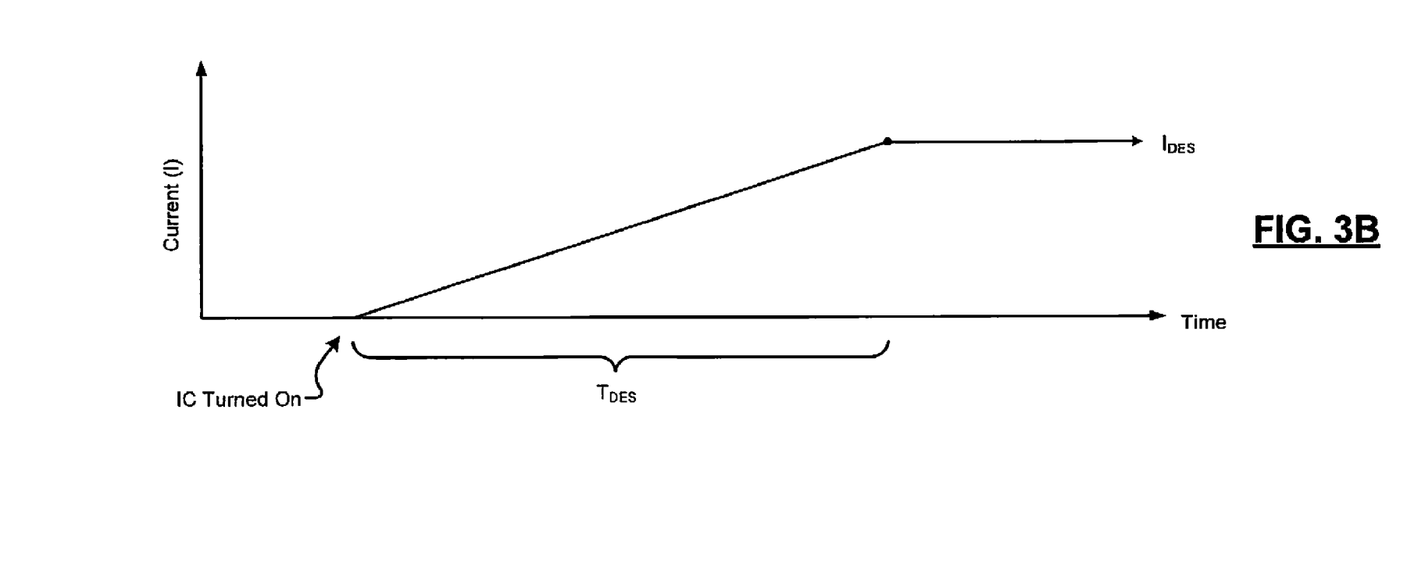

Referring now to FIGS. 3A-3B, examples of timing diagrams illustrate an increase of the frequency $f_{CLK}$ of the gated clock signal $CLK_{GATE}$ and a corresponding increase in power supply current. FIG. 3A illustrates the increase of the frequency $f_{CLK}$ of the gated clock signal $CLK_{GATE}$ which alternates between a first state ($CLK_{GATE\_L}$) and a second state ($CLK_{GATE\_H}$). Specifically, a linear increase of the frequency $f_{CLK}$ during the desired period $T_{DES}$ is shown. A non-linear increase of the frequency $f_{CLK}$, however, may also be performed. FIG. 3B, on the other hand, illustrates the change in power supply current (I) in response to the change in frequency $f_{CLK}$ of the gated clock signal $CLK_{GATE}$. After turning on the IC 20, the frequency $f_{CLK}$ of the gated clock signal $CLK_{GATE}$ is increased from zero to the desired frequency $f_{DES}$. Accordingly, the current (I) flowing from the power supply 30 to the IC 20 increases from zero to a desired current ($I_{DES}$).

Figure 3C:
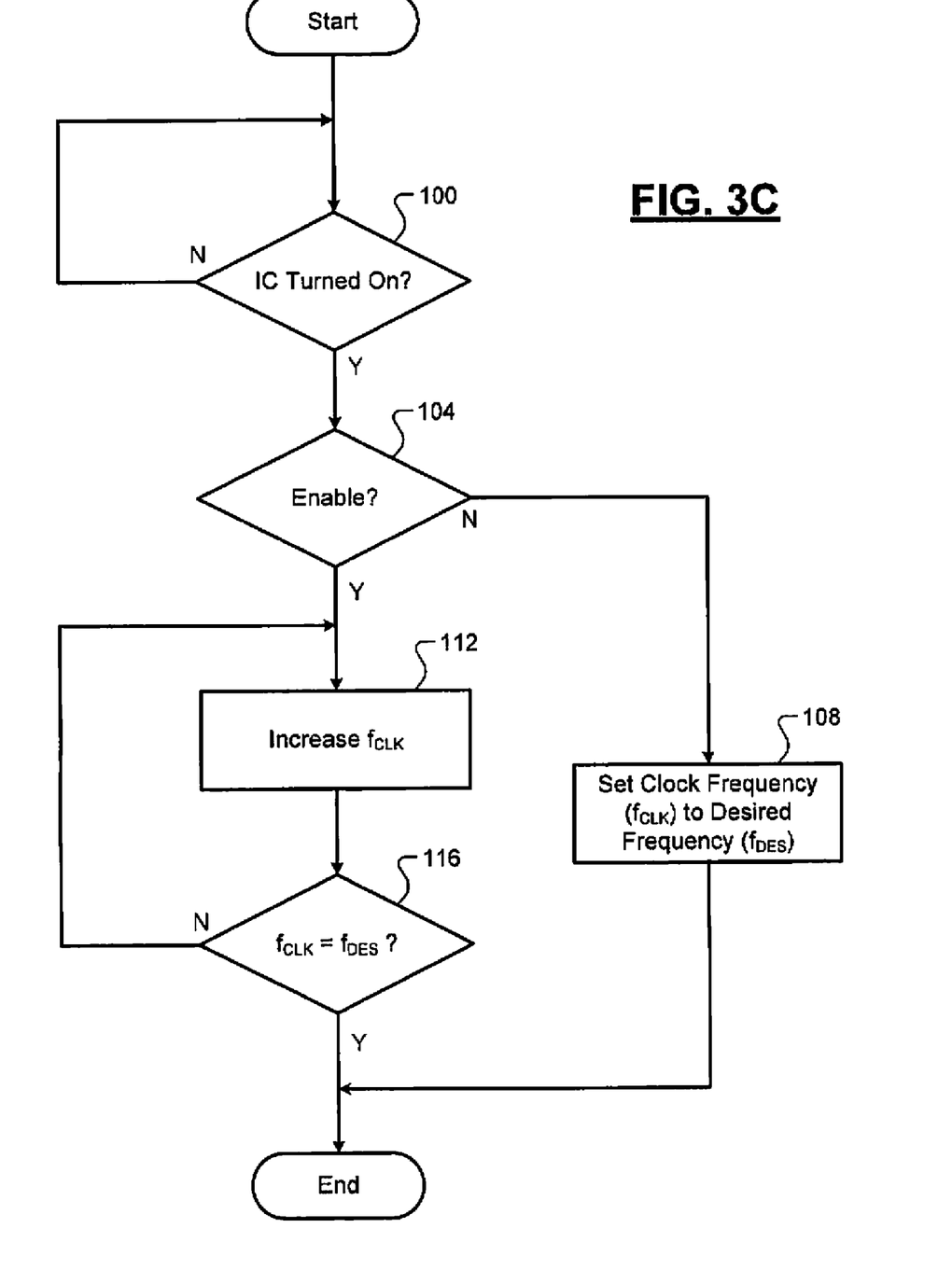
FIG. 3C is a flow diagram illustrating an example of a method for controlling power supply current using clock gating according to one implementation of the present disclosure.

Referring now to FIG. 3C, an example of a first method for controlling power supply current using clock gating begins at 100. At 100, the control module 40 determines whether IC 20 has turned on. If true, control may proceed to 104. If false, control may return to 100. At 104, the control module 40 determines whether the power supply current control feature is enabled (i.e., enable signal is active). If true, control may proceed to 112. If false, control may proceed to 108. At 108, the control module 40 may set the frequency $f_{CLK}$ of the gated clock signal $CLK_{GATE}$ to the desired clock frequency $f_{DES}$. Control may then end.

At 112, the control module 40 may increase the frequency $f_{CLK}$ of the gated clock signal $CLK_{GATE}$. Specifically, the control module 40 may increase the frequency $f_{CLK}$ towards the desired clock frequency $f_{DES}$. For example, the control module 40 may increase the frequency $f_{CLK}$ by a predetermined amount during each of predetermined intervals of the desired period $T_{DES}$. At 116, the control module 40 determines whether the frequency $f_{CLK}$ equals the desired clock frequency $f_{DES}$. If true, control may end. If false, control may return to 112.

Figure 4A:
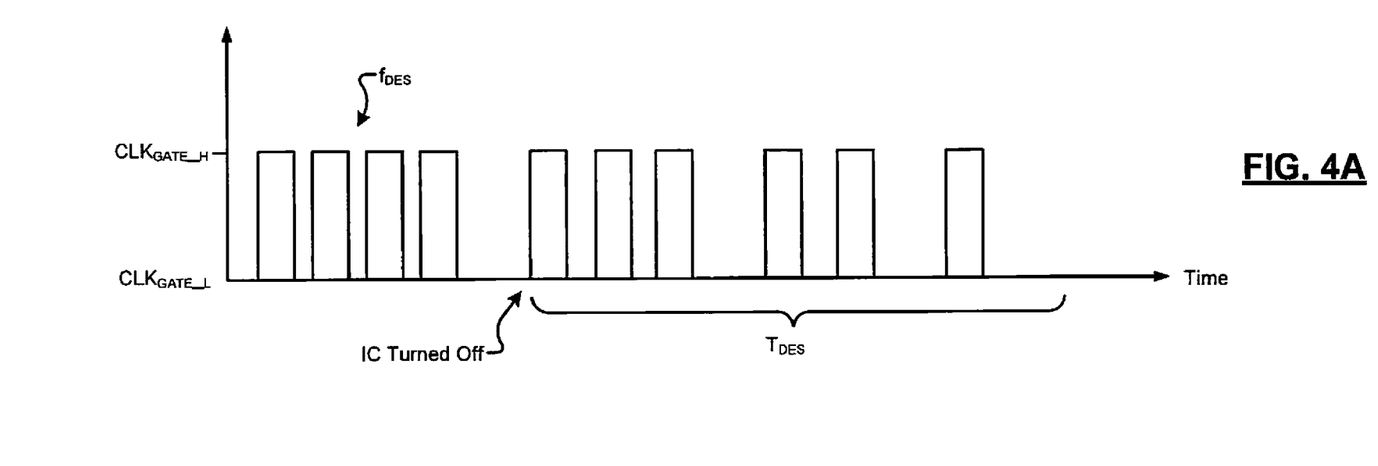
FIGS. 4A-4B are examples of timing diagrams illustrating power supply current control using clock gating according to another implementation of the present disclosure.
Figure 4B:
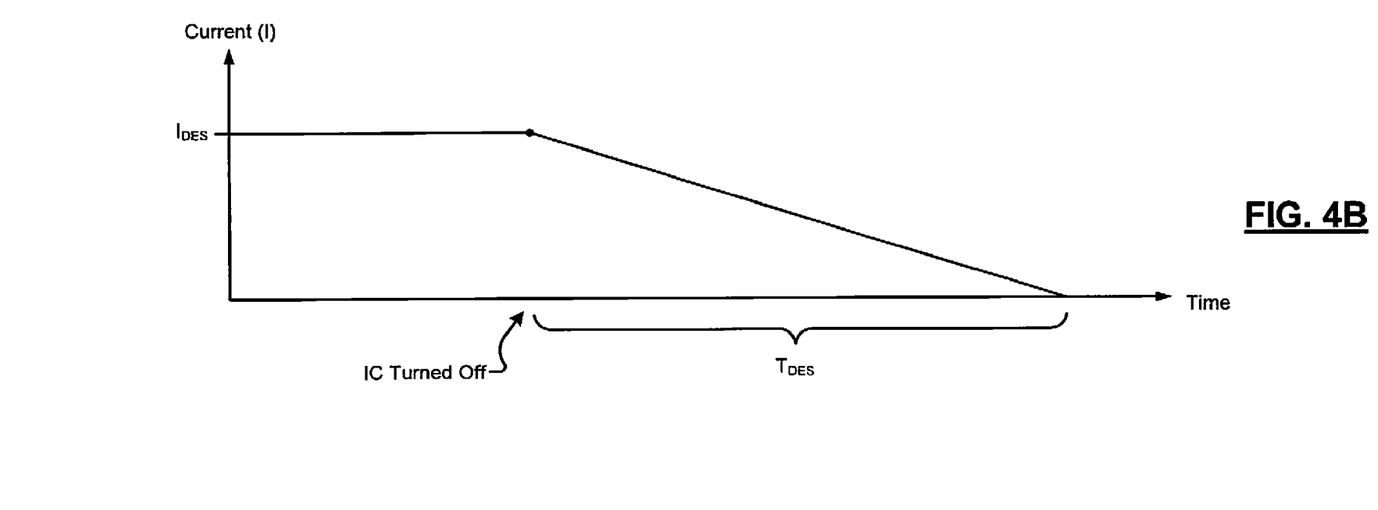

Referring now to FIGS. 4A-4B, example timing diagrams illustrate a decrease of the frequency $f_{CLK}$ of the gated clock signal $CLK_{GATE}$ and a corresponding decrease in power supply current. FIG. 4A illustrates the decrease of the frequency $f_{CLK}$ of the gated clock signal $CLK_{GATE}$ which alternates between a first state ($CLK_{GATE\_L}$) and a second state ($CLK_{GATE\_H}$). Specifically, a linear decrease of the frequency $f_{CLK}$ during the desired period $T_{DES}$ is shown. A non-linear decrease of the frequency $f_{CLK}$, however, may also be performed. FIG. 4B, on the other hand, illustrates the change in power supply current (I) in response to the change in frequency $f_{CLK}$ of the gated clock signal $CLK_{GATE}$. Specifically, prior to turning off the IC 20 the frequency $f_{CLK}$ of the gated clock signal $CLK_{GATE}$ is decreased from the desired frequency $f_{DES}$ to zero. Accordingly, the current (I) flowing from the power supply 30 to the IC 20 decreases from a desired current ($I_{DES}$) to zero. The IC 20 may then be turned off.

Figure 4C:
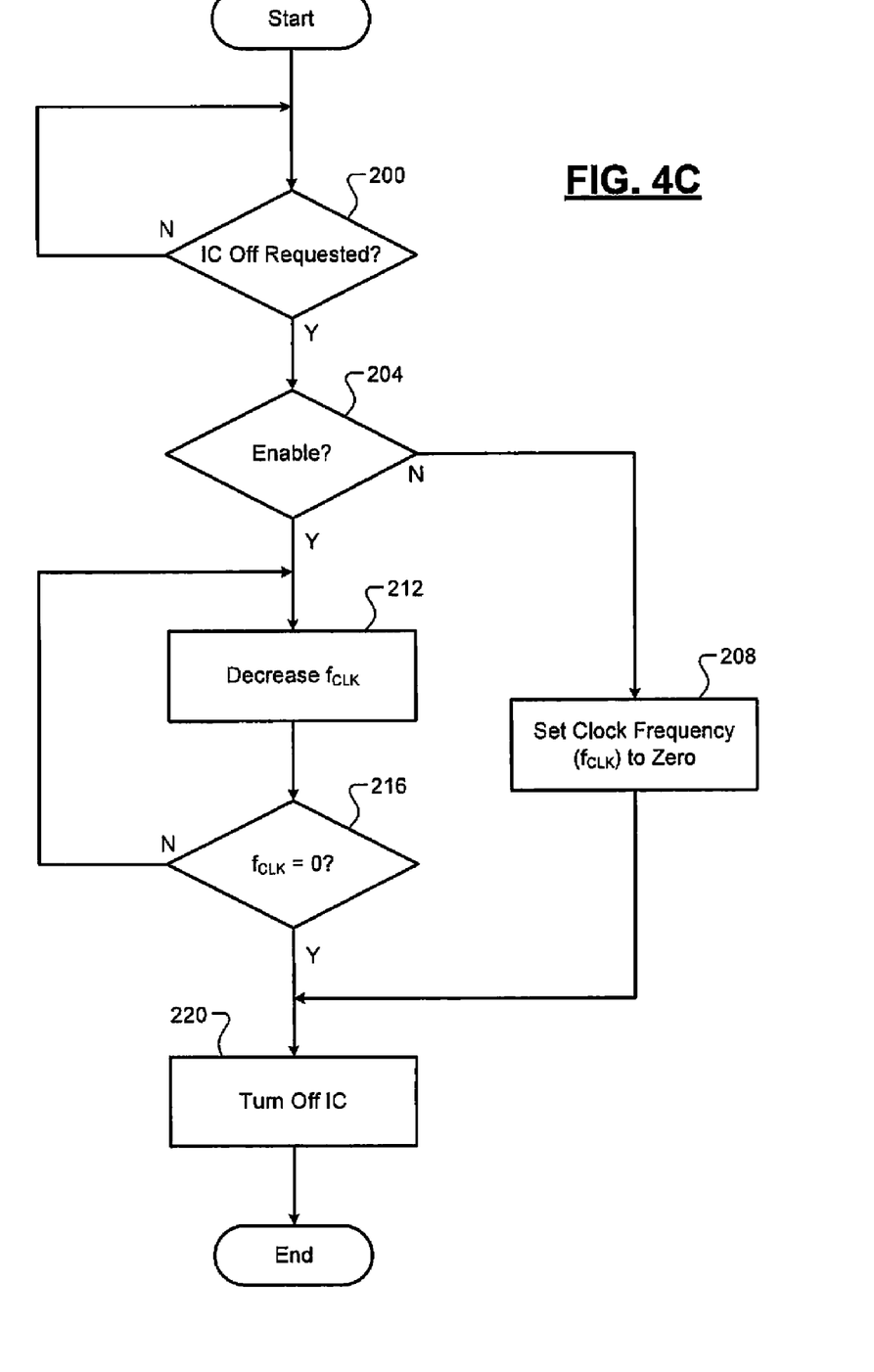
FIG. 4C is a flow diagram illustrating an example of a method for controlling power supply current using clock gating according to another implementation of the present disclosure.

Referring now to FIG. 4C, an example of a second method for controlling power supply current using clock gating begins at 200. At 200, the control module 40 determines whether turning off the IC 20 has been requested. If true, control may proceed to 204. If false, control may return to 200. At 204, the control module 40 determines whether the power supply current control feature is enabled (i.e., enable signal is active). If true, control may proceed to 212. If false, control may proceed to 208. At 208, the control module 40 may set the frequency $f_{CLK}$ of the gated clock signal $CLK_{GATE}$ to zero. Control may then end.

At 212, the control module 40 may decrease the frequency $f_{CLK}$ of the gated clock signal $CLK_{GATE}$. Specifically, the control module 40 may decrease the frequency $f_{CLK}$ to a frequency less than the desired clock frequency $f_{DES}$. For example, the control module 40 may decrease the frequency $f_{CLK}$ by a predetermined amount during each of predetermined intervals of the desired period $T_{DES}$. At 216, the control module 40 determines whether the frequency $f_{CLK}$ equals zero. If true, control may proceed to 220. If false, control may return to 212. At 220, the control module 40 may turn off the IC. Control may then end.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A control system comprising:
   a clock gating module configured to generate a gating signal based on an enable signal, a given period, and a base clock signal having a given frequency; and
   a clock comparison module configured to generate a gated clock signal based on the base clock signal and the gating signal.

2. The control system of claim 1, wherein the clock gating module is configured to generate the gating signal to increase a frequency of the gated clock signal from zero to the given frequency during the given period.

3. The control system of claim 2, wherein the frequency of the gated clock signal increases linearly or exponentially during the given period.

4. The control system of claim 1, wherein the clock gating module is configured to generate the gating signal to decrease the frequency of the gated clock signal from the given frequency to zero during the given period.

5. The control system of claim 4, wherein the frequency of the gated clock signal decreases linearly or exponentially during the given period.

6. The control system of claim 1, wherein the clock comparison module is configured to generate the gated clock signal based on a comparison of the base clock signal and the gating signal.

7. The control system of claim 6, wherein the comparison includes performing a logical AND operation of the base clock signal and the gating signal.

8. The control system of claim 1, wherein the gating module is configured to generate the gating signal based on the given period and the given frequency when the enable signal is in a first state.

9. The control system of claim 8, wherein the gating module is configured to generate a gating signal having a constant first state when the enable signal is in a second state.

10. The control system of claim 1, wherein the clock comparison module is configured to generate the gated clock signal based on the base clock signal and the gating signal when the enable signal is in a first state, and wherein the clock comparison module is configured to generate the gated clock signal based on the base clock signal when the enable signal is in a second state.

11. A method comprising:
    generating a gating signal based on an enable signal, a given period, and a base clock signal having a given frequency; and
    generating a gated clock signal based on the base clock signal and the gating signal.

12. The method of claim 11, further comprising generating the gating signal to increase a frequency of the gated clock signal from zero to the given frequency during the given period.

13. The method of claim 12, wherein the frequency of the gated clock signal increases linearly or exponentially during the given period.

14. The method of claim 11, further comprising generating the gating signal to decrease the frequency of the gated clock signal from the given frequency to zero during the given period.

15. The method of claim 14, wherein the frequency of the gated clock signal decreases linearly or exponentially during the given period.

16. The method of claim 11, further comprising generating the gated clock signal based on a comparison of the base clock signal and the gating signal.

17. The method of claim 16, wherein the comparison includes performing a logical AND operation of the base clock signal and the gating signal.

18. The method of claim 11, further comprising generating the gating signal based on the given period and the given frequency when the enable signal is in a first state.

19. The method of claim 18, further comprising generating a gating signal having a constant first state when the enable signal is in a second state.

20. The method of claim 11, further comprising generating the gated clock signal based on the base clock signal and the gating signal when the enable signal is in a first state, and generating the gated clock signal based on the base clock signal when the enable signal is in a second state.

* * * * *